United States Patent [19]
Deeks et al.

[11] Patent Number: 5,947,547
[45] Date of Patent: Sep. 7, 1999

[54] TRIM PANEL FOR A VEHICLE

[75] Inventors: Alan Robert Deeks; Kenneth Stephen Smith, both of Maidstone, United Kingdom

[73] Assignee: Magna International Investments Inc., Barbados

[21] Appl. No.: 08/824,194

[22] Filed: Mar. 25, 1997

[30] Foreign Application Priority Data

Mar. 26, 1996 [GB] United Kingdom .................... 9606294

[51] Int. Cl.$^6$ ......................................................... B60J 5/00
[52] U.S. Cl. .................. 296/146.7; 296/39.1; 296/146.6; 52/511; 52/716.3; 52/717.1; 52/718.01
[58] Field of Search ................. 296/146.7, 39.1, 296/146.6; 52/511, 716.3, 717.1, 718.01, 718.03, 718.04, 718.06, 290, 287.1, 288.1

[56] References Cited

U.S. PATENT DOCUMENTS

| | | | |
|---|---|---|---|
| 2,103,177 | 12/1937 | Randall | 52/511 |
| 2,275,553 | 3/1942 | Place | 52/511 |
| 2,387,317 | 1/1945 | Cunnington | 52/511 |
| 2,668,032 | 2/1954 | Haefner | 52/511 |
| 3,074,134 | 1/1963 | Buechler | 52/716.7 |
| 3,115,225 | 12/1963 | Fraylick et al. | 52/716.7 |
| 3,288,505 | 11/1966 | Seckerson | 52/511 |
| 3,320,712 | 5/1967 | Rapata | 52/511 |
| 3,771,275 | 11/1973 | Seckerson | 52/511 |
| 3,897,967 | 8/1975 | Barenyi | 52/716.7 |
| 4,122,583 | 10/1978 | Grittner et al. | 52/511 |
| 4,411,944 | 10/1983 | Moore | 296/39.1 |
| 4,779,930 | 10/1988 | Repper et al. | |
| 5,353,571 | 10/1994 | Berdan et al. | 52/716.6 |
| 5,573,297 | 11/1996 | DeRees et al. | 296/146.6 |

FOREIGN PATENT DOCUMENTS

| | | |
|---|---|---|
| 0 118 796 B2 | 2/1984 | European Pat. Off. . |
| 37 34371 A1 | 5/1989 | Germany . |
| 464 626 | 4/1937 | United Kingdom . |
| 1 202 898 | 8/1970 | United Kingdom . |
| 1 554 688 | 10/1979 | United Kingdom . |
| 128565 | 5/1984 | United Kingdom .................. 296/39.1 |

Primary Examiner—Joseph D. Pape
Assistant Examiner—Kiran Patel
Attorney, Agent, or Firm—Bacon & Thomas

[57] ABSTRACT

A trim panel 1 for a vehicle door structure 20 comprises a panel body 2, and an edge strip 3, secured thereto, the edge strip having at intervals therealong a plurality of connector housings 6 for receiving connectors 12 which are engageable, in use, in respective sockets 21 provided in the vehicle door structure 20 to connect the trim panel 1 thereto. The edge strip has an abutment surface 18 arranged to be sealingly engageable by a door seal 23 of a vehicle body structure when the vehicle door is closed.

20 Claims, 5 Drawing Sheets

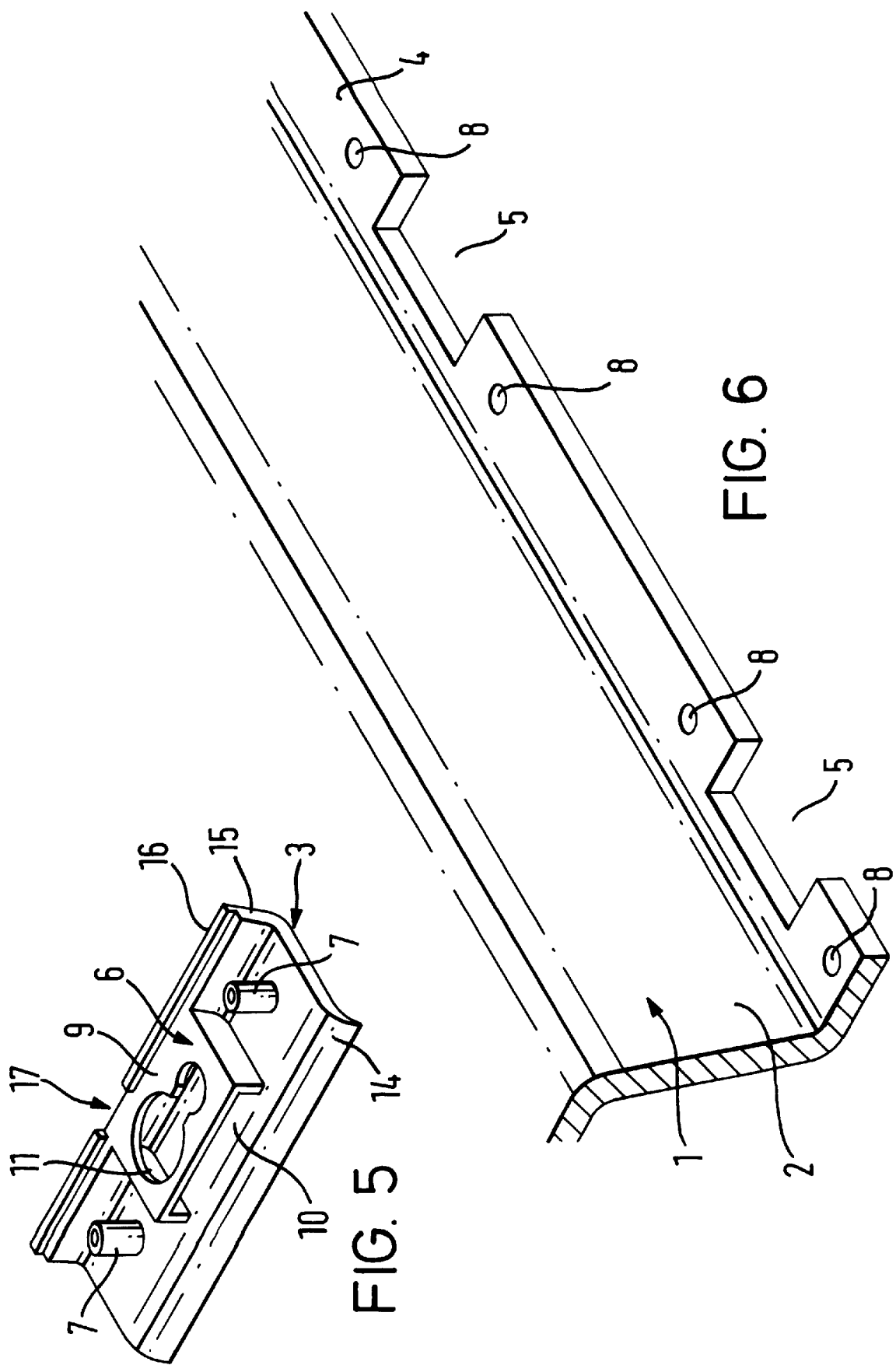

TRIM PANEL FOR A VEHICLE

The invention relates to trim panels for vehicles, for example a vehicle door trim panel for connection to a vehicle door structure, or a vehicle body trim panel for connection to a vehicle body structure.

One conventional technique for securing a trim panel pressed or moulded from wood fibre or other materials to a steel vehicle door structure is to provide metal brackets projecting from the back of the trim panel towards the door structure. The brackets support "fir tree" fixings and when the trim panel is to be secured to the vehicle door structure these fixings are aligned with sockets in the door structure and the trim panel as a whole is pushed home to engage the fixings in the sockets. This achieves an invisible connection. However, the fixings have to be accurately positioned in three dimensions in order that they will all properly engage their respective sockets, and accurate positioning of the brackets on the trim panel can be difficult to achieve. Because the trim panel profile does not necessarily follow that of the door structure, brackets of different height have to be used at the various fixing points. Tall brackets, which are commonly pressings having a "top hat" cross section, can sometimes distort when the trim panel is pushed into place, thereby causing misalignment. This problem may become more acute with a deep trim panel and it has been proposed to use moulded plastics brackets strengthened as necessary by webs, but with separate tooling required for each bracket this would be expensive.

There is a further problem with the use of metal brackets since these are usually formed with sharp stakes for attaching the brackets to the trim panel. If the stakes penetrate improperly through the panel, for example by projecting above the inwardly facing surface thereof, this can create defects on the cover material, such as vinyl, which forts the trim finish visible in the vehicle interior. Such improper penetration, caused by a malfunctioning staking operation, may be repeated on a large number of trim panels which have to be discarded. The loss may be worse if the defect is not noticed until after the cover material has been applied to the defective panels.

It has been proposed in DE-A-3 734 371 to provide a vehicle door structure formed at its edge with a "U" shaped slot which receives either a continuous or an intermittent flange projecting perpendicularly from a door covering. This arrangement is intended to avoid the use of individual fasteners at a multitude of fastening points. However, the formation of the perpendicular flange on the door covering and the formation of a "U" shaped slot in the vehicle door structure involve fundamental changes of the door covering and door structure design and the likelihood of high costs.

Viewed from a first aspect, the invention provides a trim panel for a vehicle, comprising a panel body and an edge strip secured thereto for connecting the panel body with the vehicle structure.

Viewed from a second aspect, the invention provides an edge strip adapted to be secured to a panel body of a trim panel for a vehicle, for connecting the panel body with the vehicle structure.

The vehicle structure can be a vehicle door structure or a vehicle body structure and thus the trim panel can be a vehicle door trim panel or a vehicle body trim panel.

By using an edge strip to connect the panel body to the vehicle structure, the location of a connector or a plurality of connectors or means for mounting such a connector or plurality thereof can be precisely determined on the edge strip to align correctly with a corresponding connection point or points on the vehicle structure. Thus providing the strip is secured to the panel body in the correct position, exact correspondence between the connector(s) and the connection point(s) can be ensured. This is generally easier than providing the panel body itself with connectors or connector mounting means. The use of the edge strip gives a considerable improvement over the use of conventional brackets which are individually secured to the back of the panel body with the risk that they are incorrectly positioned. In addition, by forming the connection between the trim panel and the vehicle structure at the edge of the trim panel, rather than inwardly of the edge as in conventional arrangements, the incidence of gaps at the connection can be minimised.

In a preferred arrangement, the vehicle structure is provided with connection points in the form of a plurality of sockets for receiving respective connectors, in which case the sockets, can be of a conventional type, the difference from the conventional system being that they are positioned to correspond to the edge strip at the edge of the trim panel. For example, the connectors may be "fir tree" fixings and the sockets of the type to receive such fixings.

It is thus preferred for the edge strip to have at intervals therealong a plurality of connectors to provide the connection with the vehicle structure. The connectors may be formed integrally with the edge strip, e.g. integrally moulded.

Alternatively, the edge strip may have connector housings for receiving separate connectors. Thus a preferred edge strip has at intervals therealong a plurality of connector housings for receiving a plurality of connectors. With such an arrangement the trim panel without connectors can be stacked with other trim panels for ease of transport and storage and the connectors can be added when it is desired to connect the trim panel to the structure. In a preferred arrangement, the connector housings comprise a wall spaced from the main longitudinally extending wall of the edge strip and formed with a hole through which the base of a connector may be passed to form a clip fit with the housing. A simple push fit may be used, but preferably the hole is keyhole shaped whereby the base of a connector may be passed through a first portion thereof and then moved to clip into a second, smaller portion thereof. The connector housings are advantageously integrally moulded with the edge strip, thereby ensuring their precise relative positioning.

The connectors will preferably project from the general plane of the edge strip; for example, perpendicularly thereto. Preferably, the panel body has an edge surface to which the edge strip is secured in overlapping relationship, with the general planes of the edge surface and the edge strip being substantially parallel. The edge surface may for example belong to an edge flange. In a preferred embodiment, the edge flange has cut-out regions for receiving portions of the edge strip. Such cut-out regions help the acceptance of the edge strip on the panel body during assembly. The connectors are preferably located on the portions of the edge strip accepted in the cut-out regions. This arrangement permits the edge strip to be thicker where the connectors are provided, increasing rigidity and strength, both for integral connectors or where connector housings for separate connectors are provided. In the case of the latter, the extra thickness can be particularly useful in order to create more space for clipping or otherwise fixing the connectors to the housing. The cut-out regions in the edge flange can be cut, moulded or punched into the panel body. Punching will often be convenient since the cut-out regions can be punched during the normal edge trimming punching operation.

The edge strip can be secured to the panel body in various ways, such as by welding, heat staking or mechanical fixings. Preferably, the panel body is provided with apertures which receive pins of the edge strip to secure the edge strip to the panel body. The pins and apertures can conveniently be located adjacent to the connectors, to ensure firm securing of the edge strip at least adjacent to the connectors. For example, where connector housings are received in cut-out regions of an edge flange, an aperture may be provided in the edge flange adjacent to each end of each cut-out region. The pins are preferably moulded integrally with the edge strip and, for example, are heat staked to the panel body once engaged in the apertures. Pilot or dowel pins may also be provided elsewhere on the edge strip to ensure exact positioning on the panel body.

It is sometimes necessary to remove the trim panel from the vehicle structure, particularly a vehicle door structure, to gain access to service or replace working parts mounted by the structure. Since the fixings between the trim panel and the vehicle structure are normally concealed, it can be difficult with conventional systems to determine exactly where to insert a tool such as a screw driver to lever the trim panel away from the structure without causing damage. Moreover, because the fixings are usually inwardly spaced from the edge of the trim panel, substantial force may be needed at the edge, the point of first access, to remove the trim panel. Thus damage is frequently sustained, requiring expensive replacement of the entire trim panel.

According to a preferred feature of the invention, therefore, the edge strip is provided with a plurality of openings for insertion of a tool between the edge strip and the vehicle structure, to assist removal of the trim panel from the vehicle structure. The openings are preferably at positions adjacent to the connectors, so that the tool can be inserted to apply a removal force close to the connectors, thereby reducing the chance of damage to the trim panel. If there is damage, it is more likely to be sustained by the edge strip than by the panel body, in which case the edge strip can be replaced and the cost of replacing the relatively expensive panel body can be avoided.

The trim panel may have an interior finish consisting simply of the interior surface of the panel body itself, for example if the panel body is an injection moulding. It is more common however for a trim panel to have an interior covering material, or cover stock, of e.g vinyl or cloth, and in known arrangements the material is normally wrapped around the edge of the panel body to achieve an acceptable visible effect. However, where the trim panel is provided with an edge strip according to the invention such wrapping is no longer needed since the edge of the covering material may be concealed behind the edge strip. Preferably, therefore, the trim panel comprises an interior covering material the edge of which is concealed behind the edge strip. Thus, the edge condition of the covering material is advantageously disguised.

In conventional vehicle door arrangements, the vehicle body structure is provided with a door seal against which the vehicle door closes to form a seal. This seal normally engages against an internally facing metal abutment portion of the door structure with the result that deposits of the seal material, such as rubber, build up over time on this metal portion. Moreover, there is normally a gap between the vehicle pillar and the trim panel to allow for tolerances and the door opening geometry. The size of this gap increases with large door thicknesses which are becoming more widespread to accommodate higher levels of impact absorption. The presence of the gap results in the metal of the door next to the abutment portion thereof being visible and this visible metal will normally be painted with the same paint as the vehicle exterior. This may not be desirable if the external colour does not match or coordinate with the interior colour scheme.

Advantageously therefore, the edge strip of a preferred embodiment of the present invention has an abutment surface arranged to be sealingly engageable by a door seal of a vehicle body structure when the vehicle door is closed. With this arrangement, the seal engages the abutment surface of the strip, rather than the painted metal of the door structure itself, with less likelihood of the sealing material being deposited to cause staining. Moreover, any gap between the trim panel and the door frame defined by the vehicle body structure allows the edge strip to be visible, rather than the painted metal of the door structure The colour of the edge strip can be chosen appropriately to match or contrast with other interior colours.

The invention also extends to a vehicle door having a vehicle door structure and connected thereto a trim panel as described herein and to a method of connecting a trim panel to a vehicle door structure.

Certain preferred embodiments of the invention will now be described by way of example and with reference to the accompanying drawings, in which:

FIG. 5 is a perspective view of part of the edge strip;

FIG. 6 is a perspective view of part of a panel body of the trim panel, before the edge strip has been secured thereto;

Figure 1:
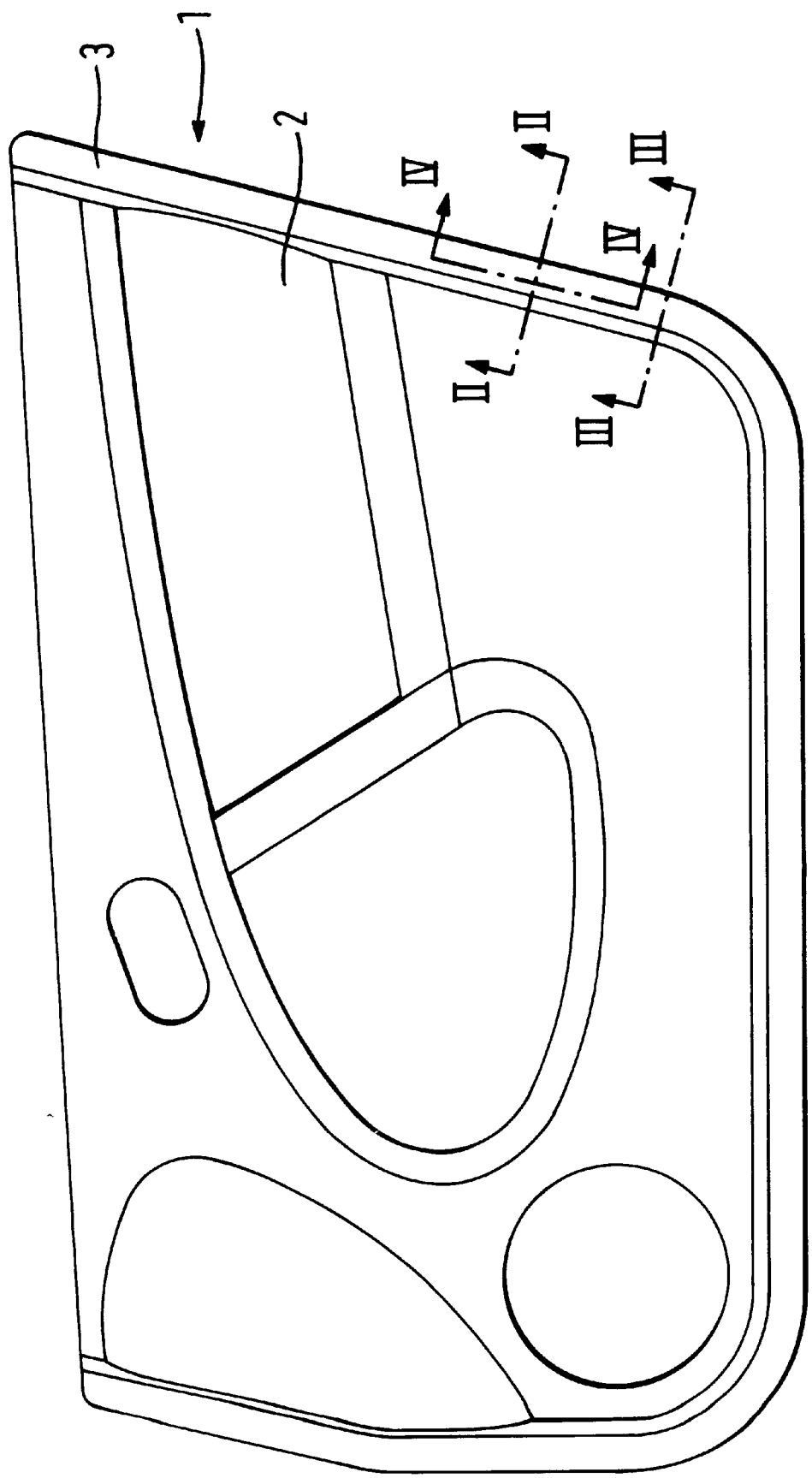
FIG. 1 is an elevation view of a trim panel for connection to a vehicle door structure, as viewed from the vehicle interior.

Referring to FIGS. 1–6, a vehicle door trim panel 1 for connection to a vehicle door structure 20 comprises a panel body 2, and an edge strip 3 secured thereto. The edge strip is preferably formed from injection moulded plastics. The panel body 2 has an edge flange 4 to which the edge strip is secured, the edge flange being interrupted at intervals by cut-out regions 5 in which are received connector housings 6 of the edge strip. The edge flange 4 of the trim panel and the edge strip 3 are both arranged parallel to the general plane of the trim panel. The edge strip has a main longitudinally extending wall 10 in face-to-face relationship with the edge flange 4.

A pair of edge strip securing pins 7 are provided adjacent to each connector housing 6, with one such pin 7 being located at a small spacing from each end of the connector housing. The edge flange 4 of the trim panel is formed with apertures 8 which receive the pins 7 which are heat-staked firmly to secure the edge strip to the trim panel If desired, additional pins 7 and apertures 8 may be provided at locations between the connector housings 6, in order to increase the retention of the edge strip 3 to the panel body 2.

Each connector housing 6 comprises a wall 9 spaced from the main wall 10 of the edge strip and formed with a key-hole shaped hole 11 having large and small diameter portions. A connector 12 in the form of a conventional "fir tree" fixing is anchored in the connector housing 6 and projects therefrom in a direction generally perpendicular to the plane of the edge strip. During assembly, a base 13 of the connector 12 is passed through the large diameter portion of the hole 11 towards the main wall 10 of the edge strip and is then slid longitudinally along the strip so that the connector 12 clips into engagement with the small diameter portion of the hole 11 to be securely anchored therein.

At its inner periphery 14, the edge strip 3 tapers and curves away from the edge flange 4 to form a neat junction with the panel body 2. At its outer periphery 15, the edge strip is formed with a longitudinally extending head 16 arranged to contact the vehicle door structure 20 when the trim panel is connected thereto. The bead 16 provides the junction between the edge strip and the vehicle door structure with a neat appearance. The bead is formed with a plurality of openings 17 (see FIG. 5), one adjacent to each connector housing 6, for insertion of a tool between the edge strip and the vehicle door structure in order to assist removal of the trim panel from the door structure, for example for repair or replacement of components within the door.

Figure 2:
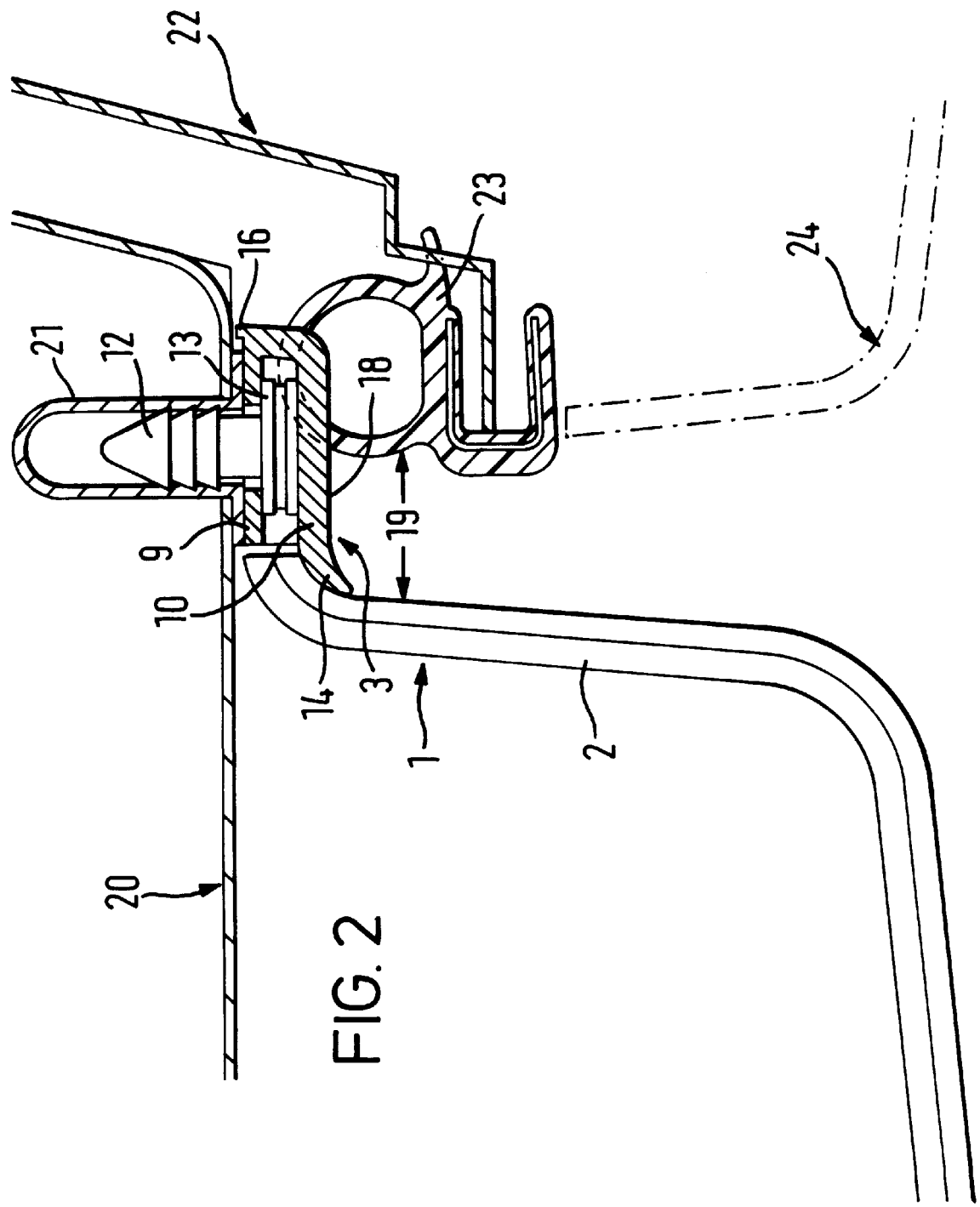
FIG. 2 is a section through the trim panel on the lines II—II of FIG. 1, showing also part of the vehicle body structure.
Figure 3:
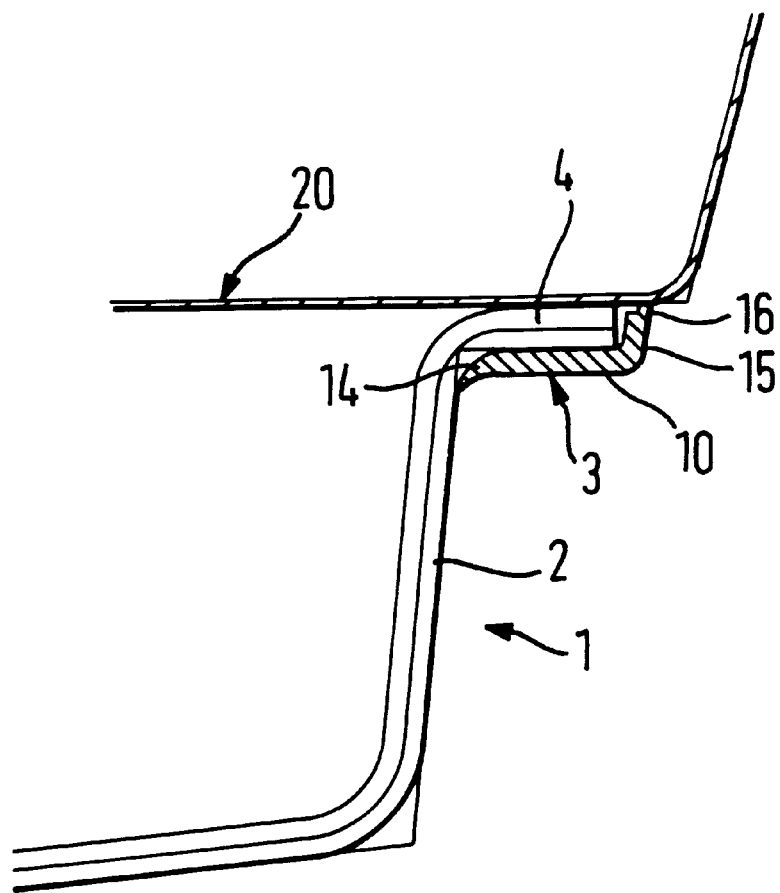
FIG. 3 is a section on the lines III—III of FIG. 1.
Figure 4:
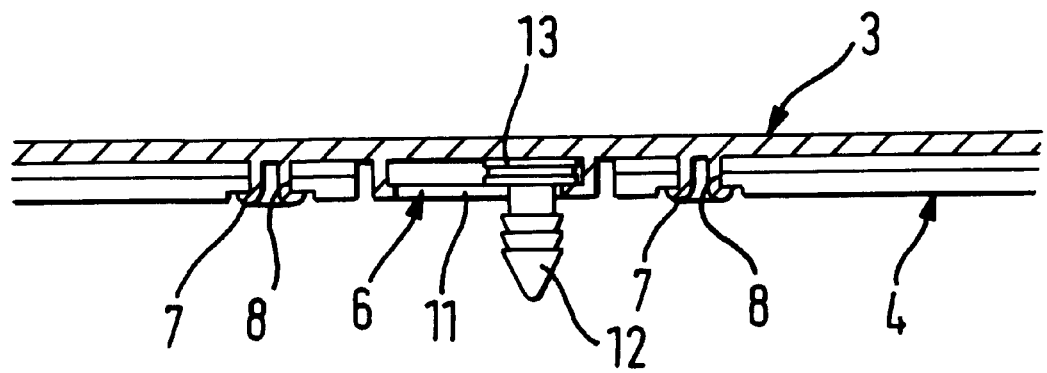
FIG. 4 is a longitudinal sectional view of part of an edge strip of the trim panel, taken along the lines IV—IV of FIG. 1.

Referring to FIG. 2, the vehicle door structure 20 is provided with a plurality of sockets 21 for receiving the connectors 12. A pillar 22 of the vehicle body structure has mounted thereon a flexible door seal 23 and the pillar trim 24. The main longitudinally extending wall 10 of the edge strip is formed with an inner abutment surface 18 against which the door seal 23 engages in the closed condition shown in FIG. 2. A gap 19 between the panel body 2 and the door seal 23 enables part of the abutment surface 18 to be visible from the vehicle interior. Advantageously, therefore, the colour of the edge strip is appropriately chosen in accordance with the interior vehicle design.

Figure 7:
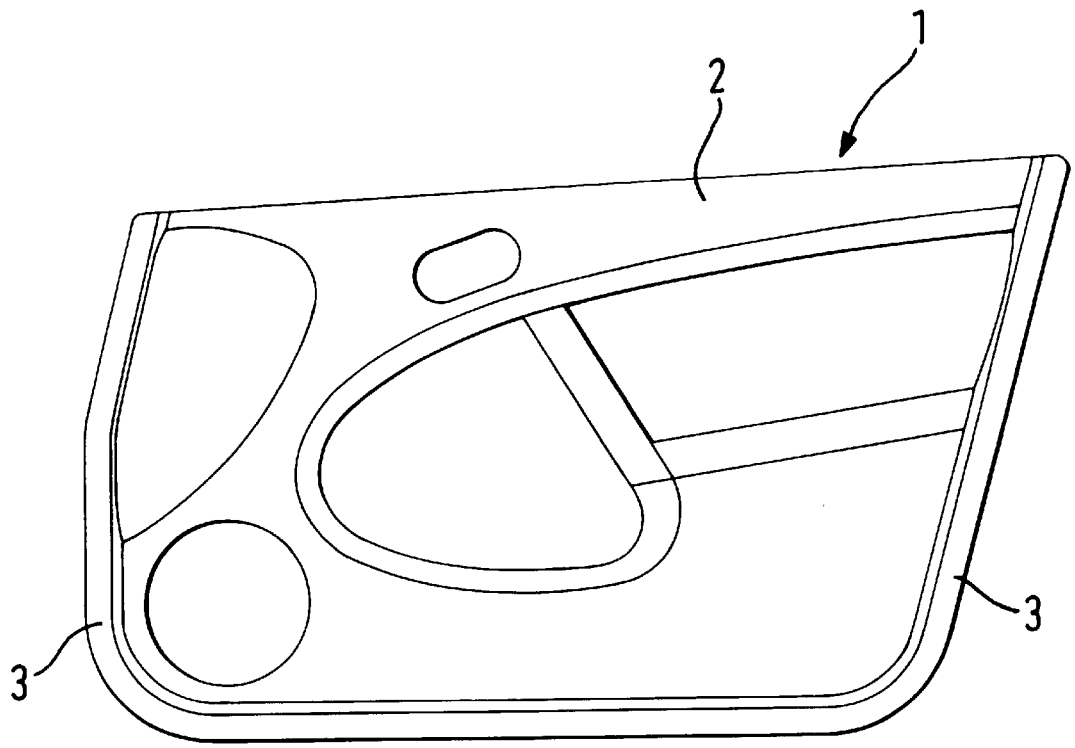
FIG. 7 is an elevation view similar to FIG. 1 but showing a second embodiment.
Figure 8:
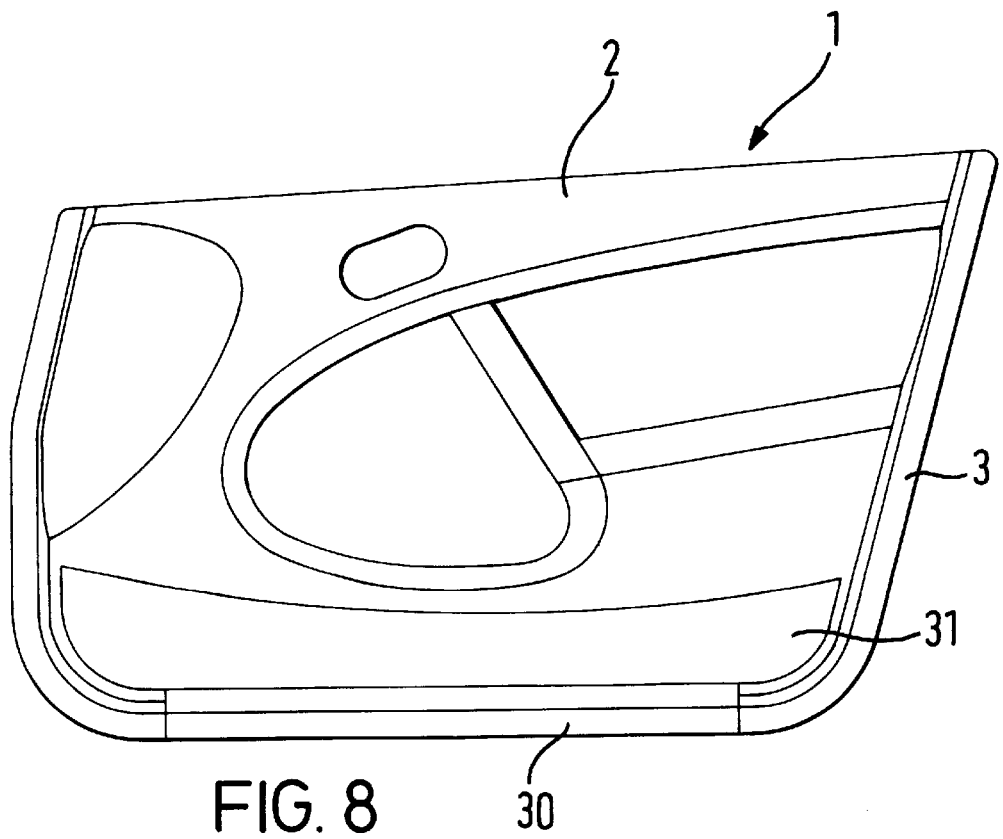
FIG. 8 is an elevation view similar to FIG. 1 but showing a third embodiment.

The edge strip 3 shown in elevation in FIG. 1 is in one piece encapsulating the sides and lower edge of the panel body 2. FIG. 7 shows an alternative arrangement in which two "hockeystick" edge strips 3 are provided at the sides of the trim panel, leaving the lower edge untrimmed. FIG. 8 shows another possible version in which a central lower portion 30 of the edge strip is integral with a door pocket 31.

We claim:

1. A trim panel for a vehicle, comprising a panel body and an edge strip secured thereto for connecting the panel body with the vehicle structure, wherein the panel body has an edge surface to which the edge strip is secured in overlapping relationship, with the general planes of the edge surface and the edge strip being substantially parallel and wherein the edge surface belongs to an edge flange which has cut-out regions for receiving portions of the edge strip.

2. A trim panel as claimed in claim 1, wherein the edge strip has at intervals therealong a plurality of connector housings for receiving a plurality of connectors to provide the connection with the vehicle structure.

3. A trim panel as claimed in claim 2, wherein the connectors project from the general plane of the edge strip.

4. A trim panel as claimed in claim 1, wherein the edge strip has at intervals therealong a plurality of connectors to provide the connection with the vehicle structure.

5. A trim panel as claimed in claim 1, wherein the panel body is provided with apertures which receive pins of the edge strip to secure the edge strip to the panel body.

6. A trim panel as claimed in claim 1, comprising an interior covering material the edge of which is concealed behind the edge strip.

7. A vehicle door having a vehicle door structure and connected thereto a trim panel as claimed in claim 1.

8. A trim panel for a vehicle comprising a panel body having an edge flange, said edge flange having an edge surface, and an edge strip for connecting the panel body with a vehicle structure, the edge strip being secured in overlapping relationship to said edge surface such that their general planes are substantially parallel, wherein said edge flange has cut-out regions for receiving portions of the edge strip.

9. A vehicle door trim panel comprising a panel body and an edge strip connected thereto for connecting the panel body with a vehicle door structure, said edge strip having an abutment surface arranged to be sealingly engageable by a door seal of a vehicle body structure when the vehicle door is closed.

10. A trim panel for a vehicle, comprising a panel body and an edge strip secured thereto for connecting the panel body with the vehicle structure wherein the edge strip is provided with a plurality of openings for insertion of a tool between the edge strip and the vehicle structure, to assist removal of the trim panel from the vehicle structure.

11. A vehicle door trim panel comprising a panel body and an edge strip secured thereto for connecting the panel body with the vehicle structure wherein the strip has an abutment surface arranged to be sealingly engageable by a door seal of the vehicle body structure when the vehicle door is closed.

12. A trim panel as claimed in claim 11, wherein the edge strip has at intervals therealong a plurality of connector housings for receiving a plurality of connectors to provide the connection with the vehicle structure.

13. A trim panel as claimed in claim 12, wherein the connectors project from the general plane of the edge strip.

14. A trim panel as claimed in claim 11, wherein the edge strip has at intervals therealong a plurality of connectors to provide the connection with the vehicle structure.

15. A trim panel as claimed in claim 11, wherein the panel body is provided with aperatures which receive pins of the edge strip to secure the edge strip to the panel body.

16. A trim panel, as claimed in claim 11, comprising an interior covering material the edge of which is concealed behind, the edge strip.

17. An edge strip adpated to be secured to a panel body of a trim panel for a vehicle, for connecting the panel body with the vehicle structure, wherein the edge strip has at intervals therealong a plurality of connector housings for receiving a plurality of connectors to provide the connection with the vehicle structure.

18. A trim panel as claimed in claim 17, wherein the connectors project from the general plane of the edge strip.

19. An edge strip adapted to be secured to a panel body of a trim panel for a vehicle, for connecting the panel body with the vehicle structure, wherein the edge strip has at intervals therealong a plurality of connectors to provide the connection with the vehicle structure.

20. A trim panel as claimed in claim 19, wherein the connectors project from the general plane of the edge strip.

* * * * *